US012799788B2

(12) United States Patent
Tuberga

(10) Patent No.: US 12,799,788 B2
(45) Date of Patent: Nov. 17, 2026

(54) FUNCTIONAL ENTITY WITH A DOOR COMPARTMENT FOR A DISPLACEABLY HELD DOOR

(71) Applicant: HAWA SLIDING SOLUTIONS AG, Mettmenstetten (CH)

(72) Inventor: Marco Tuberga, Hedingen (CH)

(73) Assignee: HAWA SLIDING SOLUTIONS AG, Mettmenstetten (CH)

(*) Notice: Subject to any disclaimer, the term of this patent is extended or adjusted under 35 U.S.C. 154(b) by 0 days.

(21) Appl. No.: 18/869,585

(22) PCT Filed: Jun. 1, 2023

(86) PCT No.: PCT/EP2023/064755
§ 371 (c)(1),
(2) Date: Nov. 26, 2024

(87) PCT Pub. No.: WO2023/232979
PCT Pub. Date: Dec. 7, 2023

(65) Prior Publication Data

US 2025/0369270 A1 Dec. 4, 2025

(30) Foreign Application Priority Data

Jun. 1, 2022 (EP) .................................... 22176725

(51) Int. Cl.
*E05D 15/58* (2006.01)
*E05C 19/16* (2006.01)
*E05D 15/26* (2006.01)

(52) U.S. Cl.
CPC .............. *E05D 15/58* (2013.01); *E05C 19/16* (2013.01); *E05D 15/264* (2013.01); *E05Y 2900/14* (2013.01); *E05Y 2900/212* (2013.01)

(58) Field of Classification Search
CPC ....... E05C 19/16; E05D 15/264; E05D 15/58; E05D 2015/586; E05Y 2201/64; E05Y 2900/14; E05Y 2900/212
See application file for complete search history.

(56) References Cited

U.S. PATENT DOCUMENTS 8,336,972 B2 12/2012 Haab et al.
9,284,761 B2 3/2016 Haab et al.
(Continued)

FOREIGN PATENT DOCUMENTS

CN 108071288 A 5/2018
WO 2020/245166 A1 12/2020

OTHER PUBLICATIONS

Sep. 21, 2023 Search Report issued in International Patent Application No. PCT/EP2023/064755.
(Continued)

*Primary Examiner* — Justin B Rephann
(74) *Attorney, Agent, or Firm* — Oliff PLC

(57) ABSTRACT

A functional entity with door compartment and door with at least a first door element having rear and front-sided edges, connects to a displacement device inside the door compartment, displaces into the door compartment and pivots outside the door compartment covering an opening of the entity, wherein the displacement device includes a mounting profile connected by mounting hinges to the first door element rear-sided edge and held by a holding device, and wherein a first spacer device with a device body is at the door compartment entrance opening and includes a first spacer roller wherein the first door element rolls during displacement without device body contact of the spacer device. The first door element connects to a first door magnet member, and the spacer device connects to a first device magnet
(Continued)

Figure 1:
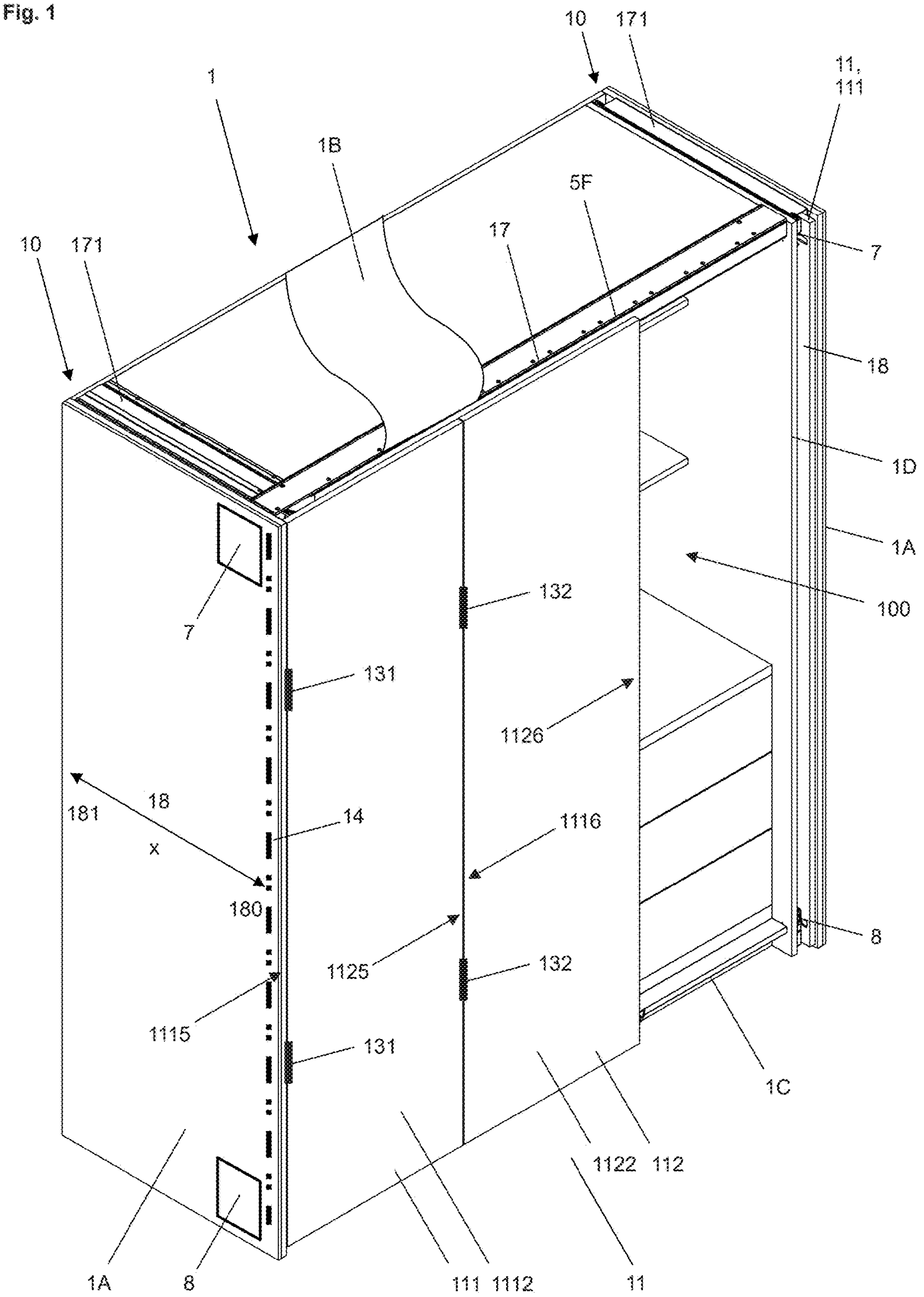

member, which interacts with the first door magnet member pulling the first door element against the spacer device.

15 Claims, 7 Drawing Sheets

(56) References Cited

U.S. PATENT DOCUMENTS

| | | | | |
|---|---|---|---|---|
| 12,352,086 | B1 * | 7/2025 | McGregor | E05D 15/0656 |
| 2015/0008811 | A1 * | 1/2015 | Ishii | E06B 3/5045 312/322 |
| 2020/0095815 | A1 * | 3/2020 | Muldrock | E05D 5/06 |
| 2020/0109586 | A1 * | 4/2020 | Inbal | E05D 15/58 |
| 2020/0157867 | A1 * | 5/2020 | Girotto | E05D 15/58 |
| 2020/0386028 | A1 * | 12/2020 | Girotto | E05F 5/003 |
| 2022/0213726 | A1 | 7/2022 | Haab et al. | |
| 2022/0307305 | A1 * | 9/2022 | Duer | E05D 15/264 |
| 2023/0320008 | A1 * | 10/2023 | Irgang | E05D 15/581 49/70 |

OTHER PUBLICATIONS

Sep. 21, 2023 Written Opinion of the International Searching Authority issued in International Patent Application No. PCT/EP2023/064755.

* cited by examiner

FUNCTIONAL ENTITY WITH A DOOR COMPARTMENT FOR A DISPLACEABLY HELD DOOR

The invention relates to a functional entity having at least one door compartment for a displaceably held door, which comprises at least a first door element displaceably held by a displacement device arranged within the door compartment.

For closing off openings of functional entities, such as pieces of furniture, room units, kitchens or sleeping areas, single-part or multi-part doors, possibly foldable sliding doors, are often used which, after the opening has been opened, are moved into a door compartment of the functional entity so as not to interfere with its appearance.

U.S. Pat. No. 8,336,972B2 discloses a piece of furniture having a displacement device comprising a mounting profile displaceable within a door compartment and connected to a door comprising a door element. The displacement device further comprises a holding device in the embodiment of a scissor cross by which the mounting profile is displaceably held in vertical alignment. The displacement device further comprises guide rails along which the mounting profile is displaceably supported by means of carriages. The door element connected to the mounting profile can thus be retracted into the door compartment and moved out of the door compartment and rotated against an opening of the piece of furniture.

WO2020245166A1 discloses a holding device comprising a structure with parallelograms.

U.S. Pat. No. 9,284,761B2 discloses a piece of furniture with a displacement device comprising a mounting profile, which is displaceable within a door compartment, and which is connected to a door comprising two hingedly interconnected and mutually foldable door elements. The first door element is connected at the rear side by mounting hinges to the mounting profile and at the front side by door hinges to the rear side of the second door element. The second door element is connected at the front to a carriage which is displaceable along a rail comprising two rail sections aligned perpendicularly to each other and interconnected by a curved section, of which a first rail section runs into the door compartment and a second rail section runs along the front of the piece of furniture. In this piece of furniture, the door, which is attached to the mounting profile, is unfolded after leaving the door compartment and moved in front of a furniture opening.

In both pieces of furniture, a rotation of the door element connected to the mounting profile takes place immediately after the exit from the door compartment. Therefore, the mobility and rotatability of this door element must be ensured. If the first door element is connected to a second door element, the second door element should also be able to move freely after leaving the door compartment so that the foldable sliding door can be unfolded and folded again. In order to achieve the required mobility of the door element or the door elements, they are therefore not rigidly guided within the door compartment. Therefore, lateral deflections of the door element are possible when moving within the door compartment. Rigid guidance of the door element or the door elements would also cause considerable effort in design and construction.

In order to prevent the door or the door element from hitting the front-sided device part during lateral movements, this device part is preferably provided with a spacer roller by means of which the door or the door element is kept at a distance from the device part during the displacement within the door compartment and preferably also during the swivelling process. The door element or the door elements can rest against the associated spacer roller during the displacement within the door compartment and roll on it without contacting the front-sided device part. The spacer rollers thus prevent the door element or the door elements from hitting the device parts of the displacement device; however, precise guidance or stable holding of the door element or the door elements is not achieved by means of the spacer rollers. Hence, undesired movements, disturbances during displacement and noises, possibly caused by hitting the spacer rollers, can still occur.

Furthermore, a relatively large cross-section of the door compartment must be provided for these functional entities so that the door elements cannot hit a side wall or a separation wall when entering or leaving the door compartment.

A piece of furniture in which a door is guided by spacer rollers is also known from CN108071288A.

The present invention is therefore based on the object of creating an improved functional entity, in particular a piece of furniture, with at least one door compartment and at least one door with one or more door elements, which is displaceable into the door compartment by means of a displacement device.

In particular, a functional entity shall be created in which the door elements are precisely guided within the door compartment and preferably also at least at the beginning of the pivoting process. It should thus be possible to move the door into a door compartment that comprises the smallest possible dimensions so that the usable space of the functional entity or of the piece of furniture can be optimised.

The desired improvements shall be realised with simple and cost-effective measures. It shall be possible to upgrade functional entities already in operation in a simple way and to provide them with the inventive solution.

By means of the displacement device, the door element or the door elements, which are displaceable into the door compartment, shall be guided in an advantageous manner so that no disturbances, in particular no undesired movements and noises, occur during the use of the functional entity. The door element or the door elements shall be reliably guided and held so that an increased ease of use and comfort of use of the functional entity result.

It shall be possible to use the inventive displacement device with any holding devices, such as scissor crosses, parallelograms or cable guides, by means of which a mounting profile, which is connected to the door, is held vertically aligned and displaceable within a door compartment.

The inventive displacement device shall be advantageously applicable for manual operation of the door and for operation with drive devices which perform the automatic displacement of the door within the door compartment.

The functional entity shall be able to be designed as a piece of furniture or room unit as required.

This task is solved with a functional entity according to claim 1 Advantageous embodiments of the invention are specified in further claims.

The functional entity, which has a door compartment and a door with at least a first door element, which has a rear-sided and a front-sided edge, which is connected to a displacement device arranged inside the door compartment, which is displaceable into the door compartment, and which is pivotable outside the door compartment in order to cover an opening of the functional entity.

The displacement device comprises a mounting profile, which is connected by mounting hinges to the rear-sided edge of the first door element and which is held by a holding device vertically aligned and displaceable along a running axis between an entrance opening and a rear side of the door compartment.

Further, a first spacer device with a device body is provided, which is arranged at the entrance opening of the door compartment and which comprises a first spacer roller on which the first door element can roll during displacement without contacting the device body of the spacer device.

According to the invention the first door element is connected to a first door magnet member on a side facing the spacer device, and the spacer device is connected to a first device magnet member on a side facing the first door magnet member, which magnetically interacts with the first door magnet member in such a way that the first door element is pulled against the spacer device as soon as the first door magnet member and the first device magnet member, of which at least one is a permanent magnet, lie opposite one another.

The door magnet member or the door magnet members and the corresponding or the corresponding device magnet members are device magnet member therefore ferromagnetic or permanently magnetic in such a way that they magnetically attract each other. The device magnet member or the device magnet members are preferably permanent magnets while the door magnet member or the door magnet members are ferromagnetic. However, the device magnet member or the device magnet members may also be ferromagnetic while the door magnet member or the door magnet members are permanent magnets. Furthermore, both, the device magnet member or the device magnet members and the door magnet member or the door magnet members may be permanent magnets.

The door magnet member or the door magnet members and the corresponding device magnet member or the corresponding device magnet members are preferably arranged at least approximately at the same height. The door magnet members are preferably ferromagnetic plates which, during the displacement of the door element or the door elements, are preferably guided past the device magnet member or the device magnet members at the same height. The door magnet member or the door magnet members and the corresponding device magnet member or the corresponding device magnet members are therefore preferably arranged in such a way that an optimal magnetic coupling results.

The spacer roller or the spacer rollers are preferably arranged at the height of the door magnet member or the door magnet members so that the spacer roller or the spacer rollers can roll on the associated door magnet member or a cover or coating lying on it. This has the advantage that ideal running surfaces for the spacer rollers can be formed by means of the door magnet members or the door magnet members or their covers or coating. The inner side of the door element can therefore comprise any surface texture. In addition, the magnets are protected by the cover or coating against external chemical or mechanical influences.

In all embodiments, the device magnet member is set back with respect to the associated spacer roller so that only the spacer roller, but not the device magnet member, can touch the facing inner side of the door element. Preferably, spacer rollers are used which are made of plastic.

The spacer rollers are preferably held by a roller holder that is adjustable as required. Preferably, the adjustable roller holder is connected to a buffer element, so that the adjustment of the buffer element, which for example forms the end stop for the mounting profile or a guide carriage connected to it, is simultaneously carried out together with the necessary adjustment of the associated spacer rollers.

The device magnet members are preferably plate-shaped, pill-shaped, tablet-shaped, cylindrical and connected to the device body of the associated spacer device and preferably recessed into a recess of the device body. The first device magnet members or the first and second device magnet members may also comprise a plurality of magnetic elements that are preferably plate-shaped, pill-shaped, tablet-shaped or cylindrical.

The door magnet members can also be pill-shaped, tablet-shaped, cylindrical or comprise pill-shaped, tablet-shaped or cylindrical magnet elements. Preferably, however, the door magnet members are in the form of plates whose longitudinal axis extends parallel to the direction of displacement profile. Preferably, mounting the door magnet members are of the ferromagnetic plates, for example steel plates. The door magnet members can also be plastic elements or plastic strips in which ferromagnetic or permanent magnetic material, for example steel chips, are enclosed.

Therefore, the first door element is pulled against the spacer device and thus against the first spacer roller by the interaction between the first door magnet member and the first device magnet member, at least in an area in which it is displaceable within the door compartment. The first door element is therefore pushed away from the body of the spacer device by the spacer roller and simultaneously pulled against the spacer roller by the force of the device magnet members. The first door element thus always remains in a certain position when stationary, resting against the spacer roller. Therefore, automatic movements of the first door element and corresponding disturbances, such as impact noises, are excluded.

In particular, after the first door element has been fully retracted into the door compartment, the front-sided edge of the door element that is remote from the mounting profile and not directly connected to the mounting profile is in contact with the spacer roller and cannot perform any unwanted pivoting movements. When moving the first door element within the door compartment, the first door element follows a path determined by the spacer roller and is therefore precisely moved into and out of the door compartment. Contact of a side wall or a separation wall by the door element or the door elements is therefore avoided.

Due to the precise guidance of the door element or the door elements of the door, the functional entity or the piece of furniture can be provided with a door compartment or a first and a second door compartment that comprise minimal dimensions.

The inventive guidance of the door elements by magnetic coupling is also particularly advantageous because the coupling of the door elements to the spacer device and in particular the decoupling of the door elements from the spacer device always takes place optimally and safely without the need for any mechanical guidance.

In a preferred embodiment of the functional entity, the first door element is connected at the front-sided edge by door hinges to a confronting rear-sided edge of a second door element, which can be inserted into the door compartment in parallel alignment with the first door element in such a way that the at least one spacer device, which comprises a second spacer roller facing the second door element, is enclosed between the first and second door element. Thereby, the second door element is connected to a second door magnet member on a side facing the spacer device and the spacer device is connected to a second device magnet member on a side confronting the second door magnet member, which magnetically interacts with the second door magnet member and pulls it against the spacer device.

When using a foldable sliding door, the first and second door elements are preferably provided with door magnet members that magnetically interact with device magnet members of the spacer device. This ensures that both door elements are precisely held and precisely guided. The mobility of the two door elements, which are connected to each other by door hinges at the ends facing one another, is thus eliminated. Undesired movements and an uncontrolled transfer path of the door elements are avoided.

In a further preferred embodiment, it is provided that an upper spacer device is arranged on the upper side of the door compartment, and that the first door element on the side facing the upper spacer device is connected to an upper first door magnet member, and that the upper spacer device on a side facing the upper first door magnet member is connected to at least one upper first device magnet member, which magnetically interacts with the upper first door magnet member; and that a lower spacer device is arranged on the lower side of the door compartment, and that the first door element on the side facing the lower spacer device is connected to a lower first door magnet member, and that the lower spacer device on a side facing the lower first door magnet member is connected to at least one lower first device magnet member which magnetically interacts with the lower first door magnet member.

The first door element is therefore precisely held and guided at the upper side and at the lower side. If the first door element is connected to a second door element, the second door element is preferably also held precisely at the upper side and at the lower side by means of the inventive measures.

Preferably, it is provided that the second door element on the side facing the upper spacer device is connected to an upper second door magnet member, and that the upper spacer device on a side facing the upper second door magnet member is connected to at least one upper second device magnet member, which magnetically interacts with the upper second door magnet member; and that the second door element on the side facing the lower spacer device is connected to a lower second door magnet member, and that the lower spacer device on a side facing the lower first door magnet member is connected to at least one lower second device magnet member which magnetically interacts with the lower second door magnet member.

As already described, at least one of the door magnet members and corresponding device magnet members is a permanent magnet.

In particularly preferred embodiments, it is provided that the mounting profile is connected at an upper end piece to an upper guide carriage, which is displaceably supported on an upper guide rail, by which the upper spacer device is held front-sided, and/or that the mounting profile is connected at a lower end piece to a lower guide carriage, which is displaceably supported on a lower guide rail, by which the lower spacer device is held front-sided.

By means of the guide carriages and the guide rails the mounting profile is kept stable. The load of the door connected to the mounting profile is absorbed. By means of the holding device, for example a scissor cross, a parallelogram or a cable pull device, only occurring torques need to be absorbed. At the same time, the spacer devices can be easily mounted on the end sides of the guide rails facing the exit of the door compartment. The spacer rollers thus ensure that the door elements held in place cannot collide with the device body of the spacer devices and also cannot collide with the guide rails.

The first door magnet members or the first and the second door magnet members preferably extend in a plate-like manner parallel to the running axis of the mounting profile, so that the magnetic coupling between the door magnet members and the device magnet members corresponding thereto is maintained unchanged during the displacement of the door element or the door elements preferably over the entire range of displacement or over a critical range within the door compartment.

The first door magnet members or the first and second door magnet members are preferably arranged and fixed in a door recess of the first door element or of the first and of the second door element, preferably screwed, clamped, glued or cast.

Furthermore, the door magnet members are preferably covered with covers so that they are not visually noticeable. The door magnet members and the covers are preferably fully recessed into the door elements so that the door elements comprise a flat surface over the entire area.

Preferably, the door magnet members or their covers form the running surfaces for the spacer rollers. This ensures that the spacer rollers can roll on ideal running surfaces without wear or noise.

The first door magnet members connected to the first door element preferably extend directly or at a small distance from the front-sided edge of the first door element remote from the mounting profile, wholly or partially across the width of the first door element.

The second door magnet members connected to the second door element preferably extend directly or at a short distance from the rear-sided edge of the second door element connected to the first door element over the whole or part of the width of the second door element.

The device body of the spacer devices is preferably made of metal or plastic and is form-fittingly or force-fittingly connected, possibly by magnetic force, to the associated first device magnet member or the first and second device magnet members. Preferably, the device body comprises form-fitting elements by means of which the device magnet members are held form-fittingly. If the device body is made of ferromagnetic material and comprises receiving openings for the device magnet members, the device magnet members are automatically held in the receiving openings. The device magnet members can also be screwed to the device body. For example, the device magnet members comprise a bore through which a connection screw is passed and screwed into a threaded bore of the device body.

The device magnet members are preferably plate-shaped, for example rectangular or round, or cylindrical, or pill-shaped and aligned parallel to the door magnet members so that an optimal magnetic interaction is achieved.

The door magnet members or device magnet members designed as permanent magnets are preferably rare-earth magnets consisting essentially of, for example, ferrous metals (iron and/or cobalt and/or nickel) and rare-earth metals (in particular neodymium, samarium, praseodymium, dysprosium, terbium, or gadolinium).

The spacer devices preferably comprise different functions and elements. Preferably, the spacer devices comprise adjustable or non-adjustable coupling elements for coupling the holding device and/or stop elements or damper elements that can interact with the guide carriages. Preferably, the adjustable buffer devices are mechanically coupled to the spacer rollers.

The spacer devices used can be identical or partially identical, so that they can be manufactured cost-effectively.

The functional entity can be a piece of furniture, for example a wardrobe, or also a room unit, such as a kitchen, a chamber or a bedroom, which is closed by at least one single-part or multi-part door, which can be parked in a door compartment.

Figure 2:
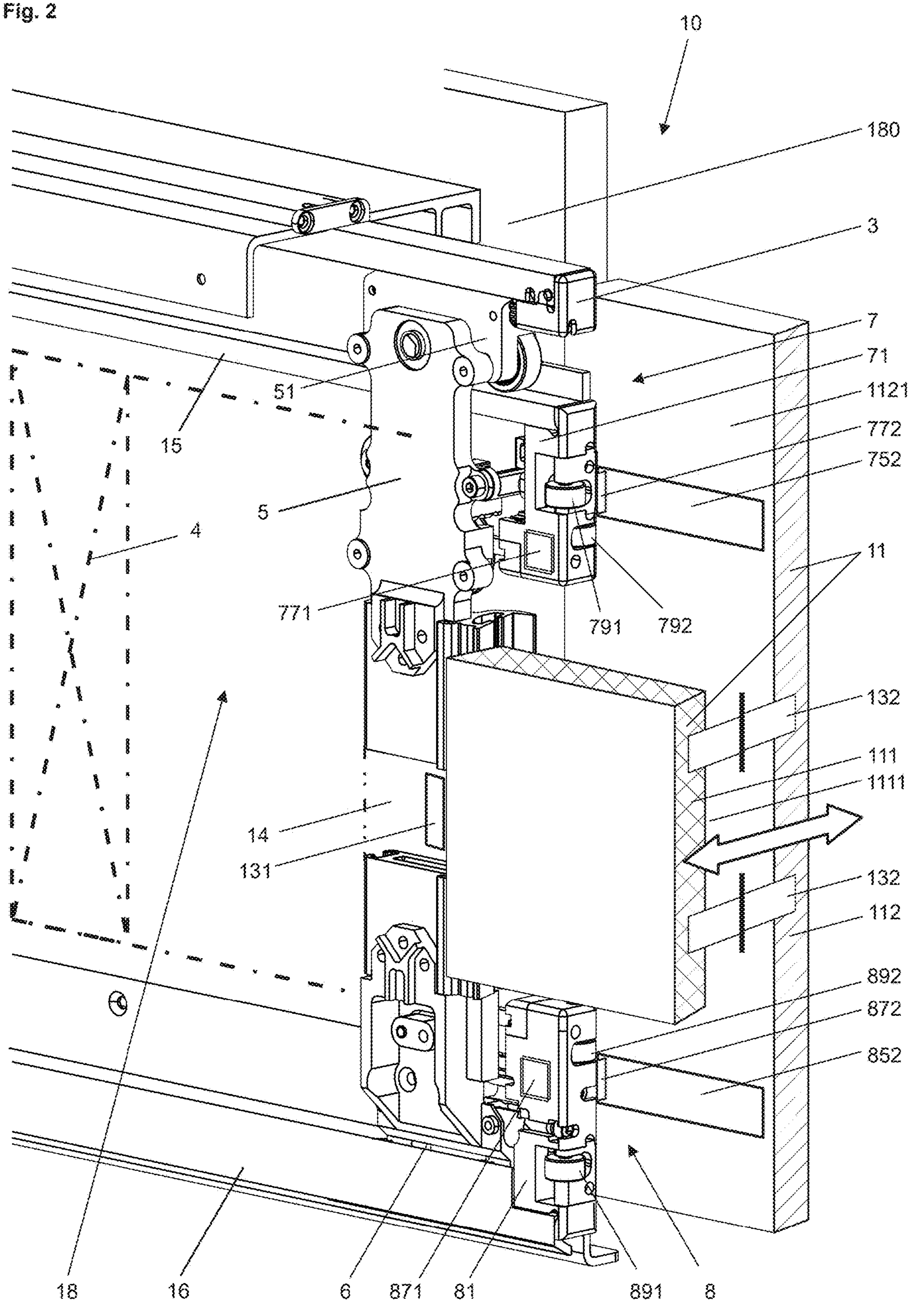
Figure 3:
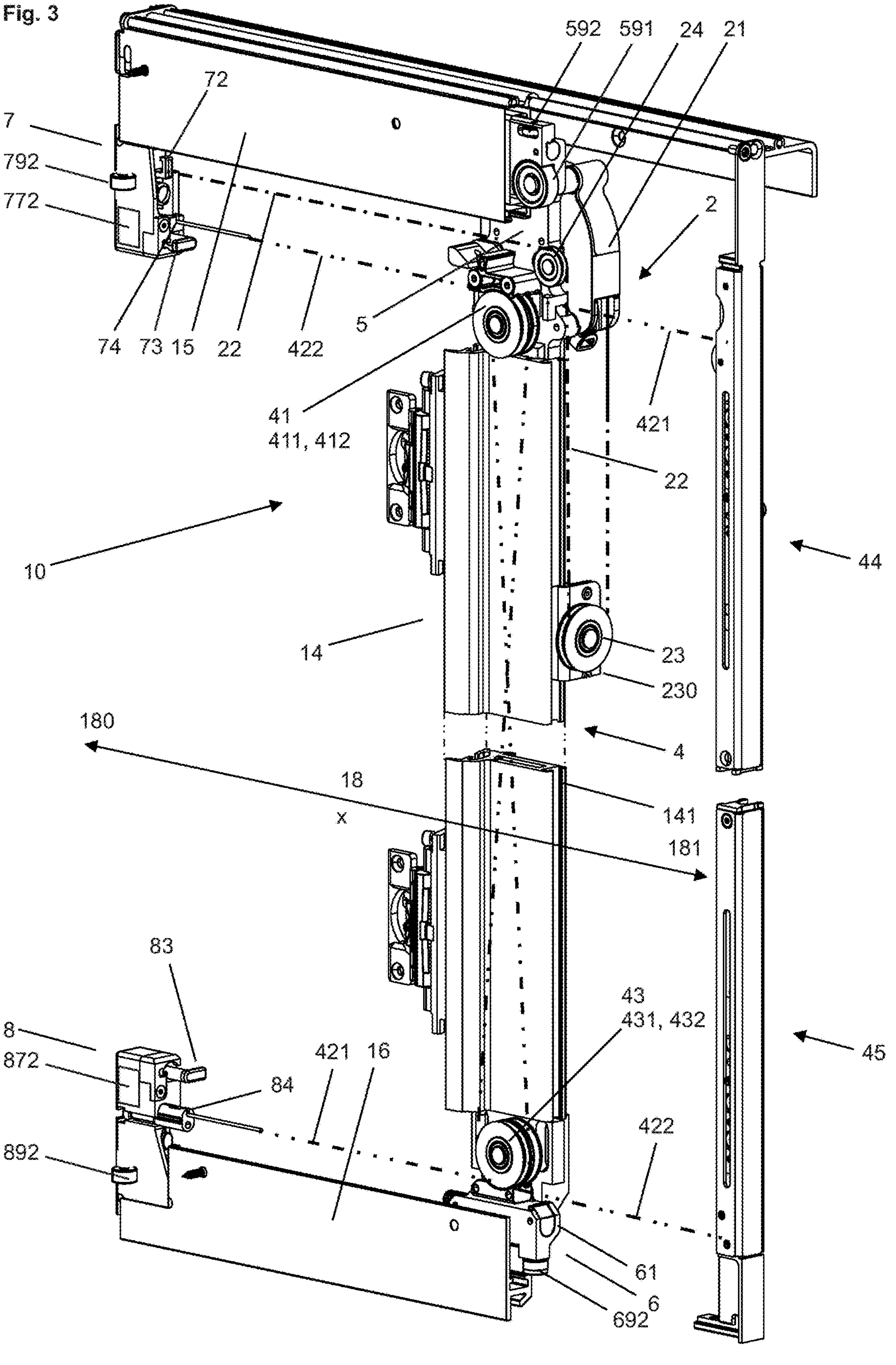
Figure 4B:
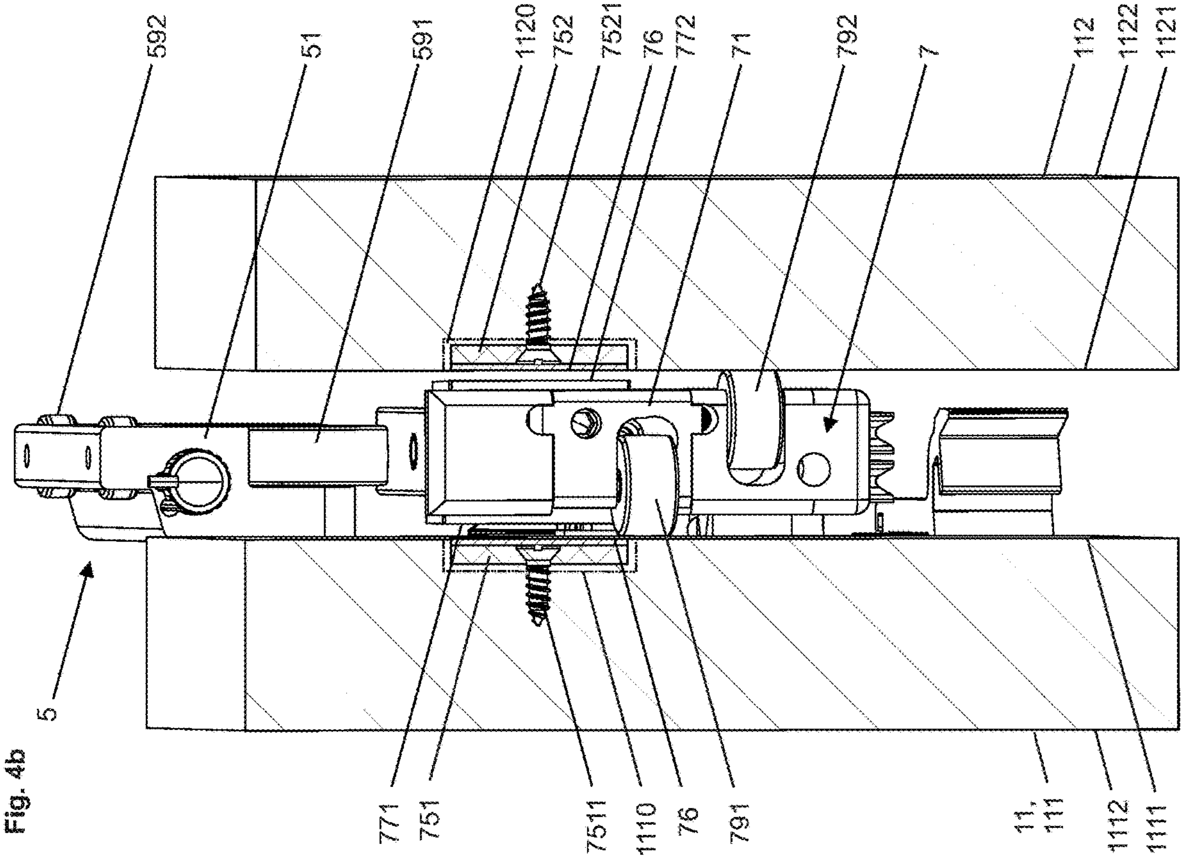
Figure 4A:
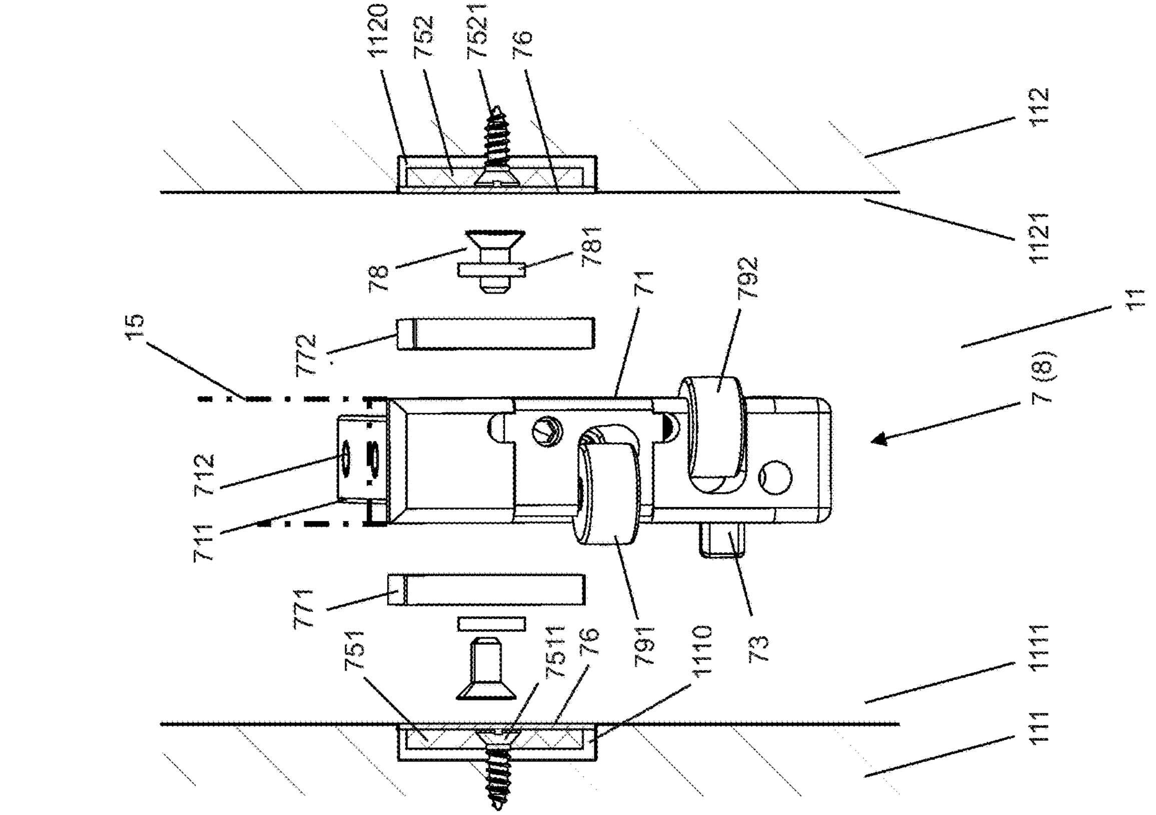
Figure 5:
Figure 6B:
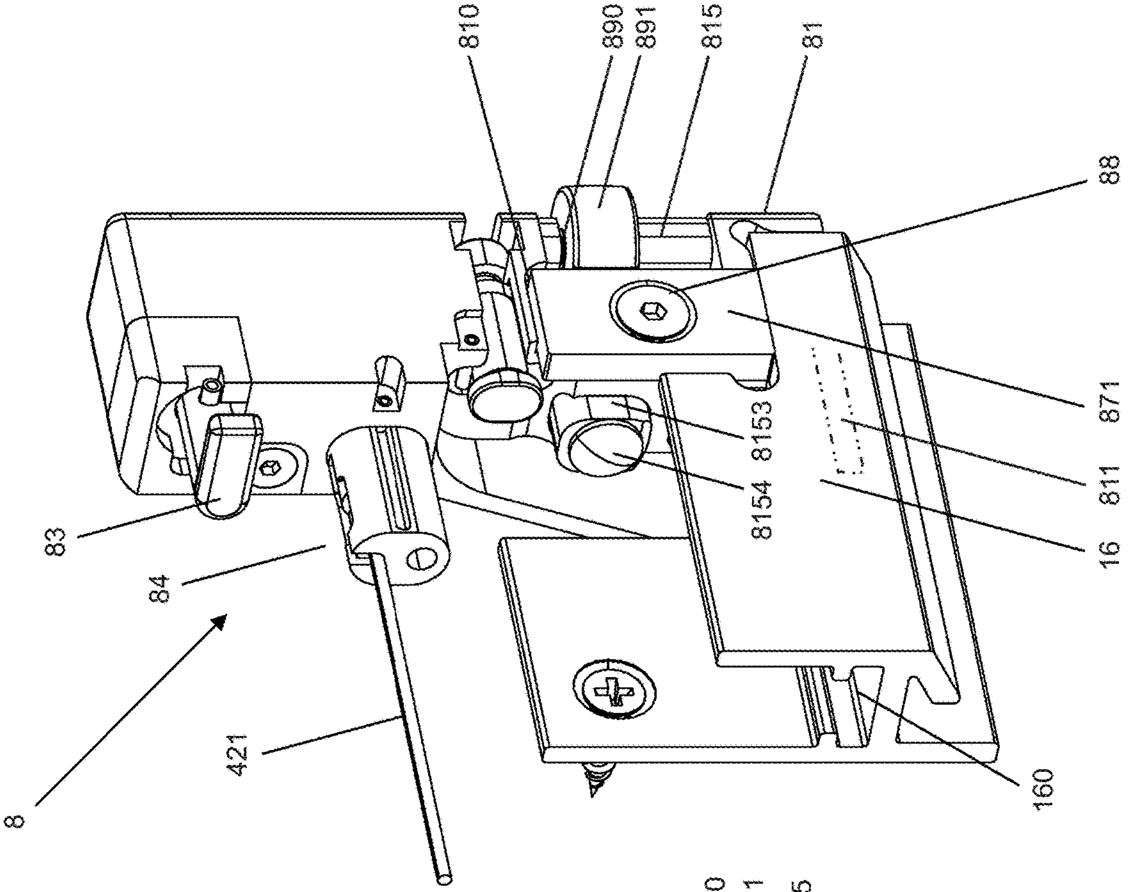
Figure 6A:
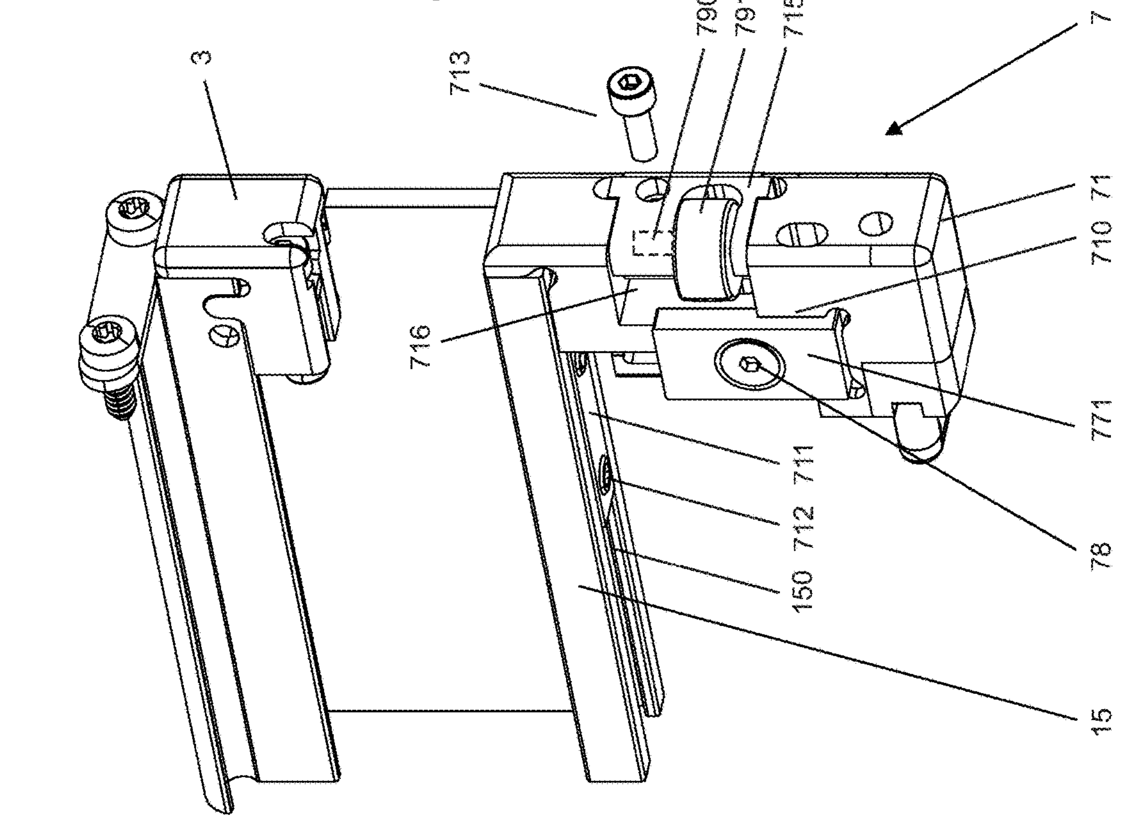
Figures 7, 8:
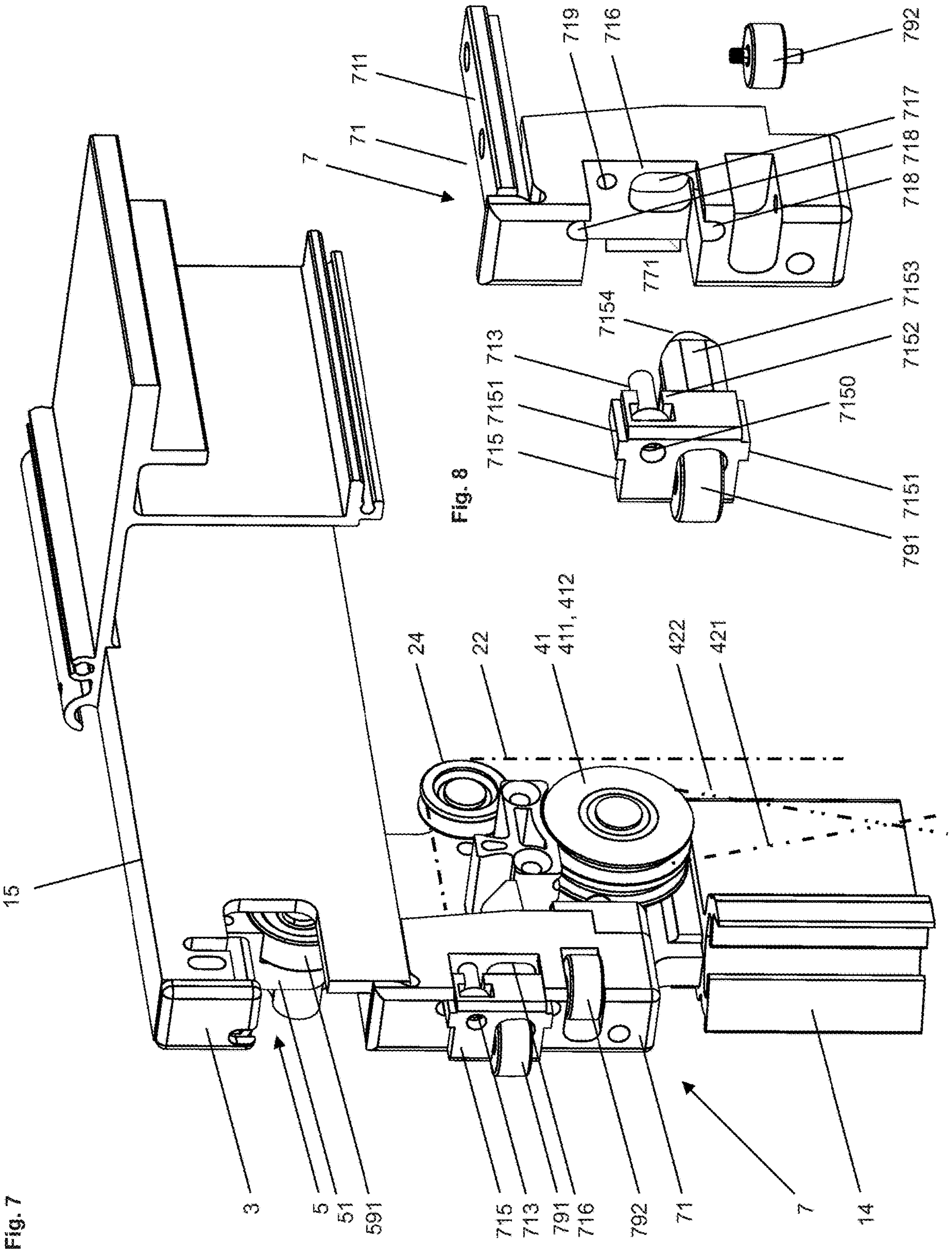

The invention is described in detail below with reference to the drawings. Thereby shows:

FIG. 1 an inventive functional entity 1 in the embodiment of a piece of furniture with a first door compartment 18, in which a mounting profile 14, which is connected to a foldable sliding door 11, is displaceably held by means of a displacement device 10 (see FIG. 3), and a second door compartment 18, in which a further mounting profile 14, which is connected to a one-piece door 11, is displaceably held by means of a displacement device 10;

FIG. 2 the displacement device 10 arranged in the first door compartment 18 of the functional entity 1 of FIG. 1 with the mounting profile 14, which is displaceable along an upper and a lower guide rail 15, 16, on which front-sided upper and lower spacer devices 7, 8 are mounted, which each comprise two spacer rollers 791, 792; 891, 892 and two device magnet members 771, 772; 871, 872, which cooperate with associated door magnet members 851, 852, which are connected to door elements 111, 112 of the foldable sliding door 11 and are preferably recessed therein (see FIG. 4*b*);

FIG. 3 the displacement device 10 of FIG. 2 from the other side with a preferred holding device 4 and an optionally provided drive device 2;

FIG. 4*a* the upper spacer device 7 of FIG. 2 with the device magnet members 771, 772 detached from the device body 71 and a section through the two door elements 111, 112 showing the plate-shaped door magnet members 751, 752 sunk into the door elements 111, 112;

FIG. 4*b* the upper spacer device 7 of FIG. 4*a* after mounting the device magnet members 771, 772;

FIG. 5 the upper and lower spacer devices 7, 8 of FIG. 2 in a preferred embodiment provided for guiding a door 11 with only one door element 111;

FIG. 6*a* the upper spacer device 7 of FIG. 5, which is held by the upper guide rail 15;

FIG. 6*b* the lower spacer device 8 of FIG. 5, which is held by the lower guide rail 16;

FIG. 7 a part of the displacement device 10 of FIG. 2 with the upper spacer device 7 in a preferred embodiment; and FIG. 8 the upper spacer device 7 of FIG. 7 in exploded view.

FIG. 1 shows an inventive functional entity or a piece of furniture 1 in the embodiment of a wardrobe in which a door compartment 18 is integrated on each side. The piece of furniture 1 comprises side walls 1A, an upper board 1B, a lower board 1C and partitions 1D, each of which together with an associated side wall 1A delimits a door compartment 18. In each door compartment 18 an inventive displacement device 10 with a mounting profile 14 is arranged, which is automatically displaceable within the door compartment 18 by manual operation or by means of a drive device (see FIG. 3, drive device 2). Doors 11 are held by the mounting profiles 14 of the sliding devices 10, which are retracted into or moved out of the associated door compartment 18 when the mounting profile 14 is moved. When the door 11 leaves the respective door compartment 18, the mounting profile 14 is displaced along a running axis x from the rear side 181 of the door compartment 18 to an entrance opening 180 of the door compartment 18.

In the first door compartment 18, a foldable sliding door 11 is held, which comprises a first and a second door element 111, 112, which are hinged to each other and can be folded towards each other. The door 11 held in the second door compartment 18 by the mounting profile 14 inside the second door compartment 10 comprises only one door element 111. The first door element 111 comprises an inner side 1111 and an outer side 1112. The second door element 112 comprises an inner side 1121 and an outer side 1122 (see FIG. 4*b*).

In FIG. 1, the foldable sliding door 11 is fully extended from the first door compartment 10 and fully unfolded so that the door elements 111, 112 are aligned in one plane and only their outer sides 1112, 1122 are visible. The door elements 111, 112 of the foldable sliding door 11 and the door element 111 of the one-piece door 11 are of equal size. The foldable sliding door 11 shown in the closed position covers therefore two thirds of the wardrobe opening 100.

The rear-sided edge 1115 of the first door element 111 of the foldable sliding door 11, which is trailing when the sliding door 11 is moved out, is connected by mounting hinges 131 to the mounting profile 14 symbolically shown by a dashed line.

The leading front-sided edge 1116 of the first door element 111 is connected by door hinges 132 to the trailing rear-sided edge 1125 of the second door element 112, whose leading front-sided edge is connected at the top to a front carriage 5F. The front carriage 5F is guided in a support rail 17, which comprises curved sections and support rail sections 171 on both sides, which extend into the door compartments 18. When entering the door compartment 18 and when travelling along the support rail 17, the front carriage 5F moves forward within an associated path, whereby the change of direction takes place within the curved section.

Inventive functional entities 1 comprise at least one spacer device 7, 8. FIG. 1 shows schematically that in this preferred embodiment of the functional entity 1 each of the displacement devices 10 comprises an upper spacer device 7 and a lower spacer device 8, which allow to precisely guide and hold the doors 11 and the door elements 111, 112, respectively.

FIG. 2 shows the displacement device 10 arranged in the first door compartment 18 of the functional entity 1 of FIG. 1 with the foldable sliding door 11, the door elements 111, 112 of which are shown cut away to show the spacer devices 7 and 8. The door elements 111, 112, which are connected to each other by door hinges 132 shown schematically, are aligned parallel to each other and can be pushed into the door compartment 18 in this alignment.

The mounting profile 14 is connected to the first door element 111 by mounting hinges 131 and is held in a vertical position by a holding device 4 (shown symbolically by dotted lines). The holding device 4 can be of any embodiment, for example a scissors cross, a parallelogram or preferably a device with holding cords as shown in FIG. 3.

The mounting profile 14 is connected at the upper end to an upper guide carriage 5, which is guided in an upper guide rail 15, and at the lower end to a lower guide carriage 6, which is guided in a lower guide rail 16. The upper guide carriage 5 comprises support rollers 591 and guide rollers 592 and, in addition to the guide function, also comprises a support function. The lower guide carriage 6 comprises guide rollers 692, which are guided in the lower guide rail 16 (see FIG. 3).

The upper guide carriage 5 and the lower guide carriage 6 are located directly in front of the entrance opening 180 of the door compartment 18. The carriage body 51 of the upper guide carriage 5 rests against a buffer device or damper device 3 mounted in the upper guide rail 15.

The upper guide rail 15 holds front-sided an upper spacer device 7 and the lower guide rail 16 holds front-sided a lower spacer device 8, each comprising a device body 71, 81. FIG. 2 shows that the spacer devices 7, 8 are enclosed between the two parallel door elements 111, 112.

On the side facing the first door element 111, the upper and lower spacer devices 7, 8 each comprise at least one first spacer roller 791, 891 and at least one first device magnet member 771, 871. On the side facing the second door element 112, the upper and lower spacer devices 7, 8 each comprise at least one second spacer roller 792, 892 and at least one second device magnet member 772, 872.

The first spacer rollers 791, 891 keep the first door element 111 at a distance and can roll along its inner side 1111. The second spacer rollers 792, 892 keep the second door element 112 at a distance and can roll on its inner side 1121. The two door elements 111, 112 can therefore not hit the device body 71, 81 of the spacer devices 7, 8 or the guide rails 15, 16.

The first device magnet members 771, 871 interact with first door magnet members 751, 851 which are connected to the first door element 111 (see FIG. 5). The second device magnet members 772, 872 interact with second door magnet members 752, 852 which are connected to the second door element 112. The first and the second device magnet members 771, 871; 772, 872 and the first and the second door magnet members 751, 851; 752, 852 interact magnetically and exert forces on each other which pull the two door elements 111, 112 against the spacer devices 7, 8. Therefore, the first and/or the second spacer rollers 791, 891; 792, 892 are always in contact with the inner sides 1111, 1121 of the first and/or second door element 111, 112 and preferably run there on the door magnet member 751, 851; 752, 852 or a cover 76, 86 provided on the door magnet member 751, 851; 752, 852, which are preferably designed as running surfaces. As mentioned, at least one of the corresponding device magnet members 771, 871; 772, 872 and the door magnet members 751, 851; 752, 852 is formed as a permanent magnet, so that a permanent magnet part cooperates with a ferromagnetic part. In preferred embodiments, the device magnet members 771, 871; 772, 872 and the door magnet members 751, 851; 752, 852 may be permanent magnets.

When moving into or out of the door compartment 18, the two door elements 111, 112 are therefore guided and held by the two spacer devices 7, 8 without play or substantially without play. In particular, even after the two door elements 111, 112 have entered the door compartment 18, their end faces 1116, 1125, which are connected to each other by the door hinges 132, are held stably by the spacer devices 7, 8. The door elements 111, 112 are therefore kept stable during travel and also when stationary and can neither strike inwards against the guide rails 15, 16 nor outwards against a side wall 1A or a separation wall 1D (see FIG. 1).

The displacement device 10 can be used to hold a single-part or multi-part door 11. With reference to FIG. 2, the use of the displacement device 10 in combination with a door with two door elements 111, 112 was described. The inventive spacer devices 7, 8, on the other hand, can also be used to guide only one door element 111 of a single-part door 11 or of the first door element 111 of a multi-part door 11. FIG. 5 shows a part of a displacement device 10 which is provided for guiding only one door element 111.

FIG. 3 shows the displacement device 10 of FIG. 2 with a preferred holding device 4 and an optionally provided drive device 2 from the other side.

The holding device 4 comprises a first front-sided cable connection device 84, a first lower reel assembly 431 disposed at the lower end of the mounting profile 14, a first upper reel assembly 411 disposed at the upper end of the mounting profile 14, and a first rear-sided cable connection device 44 disposed at the rear-sided end of the upper guide rail 15, and a first holding cable 421 connected at a first end to the first front-sided cable connection device 84, routed counterclockwise around the first lower reel assembly 431 and clockwise around the first upper reel assembly 411, and connected at a second end to the first rear-sided cable connection device 44.

Furthermore, the holding device 4 comprises a second front-sided cable connection device 74, a second upper reel assembly 412 disposed at the upper end of the mounting profile 14, a second lower reel assembly 432 disposed at the lower end of the mounting profile 14, and a second rear-sided cable connection device 45 disposed at the rear-sided end of the lower guide rail 16, and a second holding cable 422 connected at a first end to the second front-sided cable connection device 74, routed clockwise around the second upper reel assembly 412 and counterclockwise around the second lower reel assembly 432, and connected at a second end to the second rear-sided cable connection device 45.

The preferably adjustable first front-sided cable connection device 84, by means of which the first pull cord 421 can be tensioned in order to vertically align the mounting profile 14, is integrated into the lower spacer device 8. The second front-sided cable connection device 74 is integrated in the upper spacer device 7. The two rear cable connection devices 44, 45 preferably each comprise an entry pulley through which the respective holding cable 421, 422 can be inserted into a housing. Preferably, a tension spring is provided in the second rear-sided cable connection device 45, via which a constant tensile force can be transmitted to the second holding cable 422.

Hence, in the inventive holding device 4, preferably one of the holding cables 421, 422, in this embodiment the second holding cable 422, is always held resiliently. The first holding cable 421, on the other hand, is held inelastically or firmly by the first front-sided cable connection device 84 and the first rear-sided cable connection device 44 after installation. The first front-sided cable connection device 84 is adjustable to tighten the first holding cable 421 and to align the mounting profile 14 vertically.

Furthermore, the displacement device 10 optionally comprises a drive device 2 by means of which the door 11 can be automatically driven out of the door compartment 18. The exemplarily shown and preferably used drive device 2 comprises a drive unit 21 with a drive element and a pulley connected thereto, on which a pull cord 22 is wound. The drive element is, for example, a spiral spring or a helical spring, which is tensioned or released when the pulley rotates. The pull cord 22 can therefore be pulled off the pulley by force and is automatically wound back onto the pulley as it rotates back.

The pull cord 22 is guided via a first deflection roller 23, which is rotatably mounted on a deflection unit 230, and a second deflection roller 24 to a pull cord connection 72, which is arranged on the upper spacer device 7. The deflection unit 230 can be moved along the mounting profile 14 and can optionally be fixed. By moving the deflection unit 230, a desired tension can be applied to the pull cord 22.

In FIG. 3, the mounting profile 14 has been moved almost to the rear side 181 of the door compartment 18, therefore the pull cord 22 has been extended further and the drive element has been tensioned. As soon as the pull cord 22 is released again, the pulley is turned back by the tensioned drive element.

By connecting the drive device 2 to the mounting profile 14 or the guide carriage 5, it is no longer necessary to mount the drive device 2 on a rear wall, a separation wall 1D or a side wall 1A of the functional entity 1. It is particularly advantageous that the displacement device 10 with the holding device 4 and the drive device 2 can be installed in differently dimensioned door compartments 18 without modification. Only the lengths of the holding cables 421, 422 and of the pull cord 22 need to be adjusted accordingly.

It is further shown that the spacer devices 7, 8 are provided with rotatable locking levers 73, 83, by means of which the mounting profile 14, which is displaced towards the opening 180 of the door compartment 18, can be locked in order to carry out maintenance work or adjustments.

FIG. 4*a* shows the upper spacer device 7 of FIG. 2 with the device magnet members 771, 772 detached from the device body 71 and a sectional view through the two door elements 111, 112, which shows the door magnet members 751, 752 sunk into the door elements 111, 112 and the covers 76 shown in sectional view lying on the door magnet members 751, 752. The device body 71 of the spacer device 7 comprises a mounting beam 711 on the upper side, which is inserted into a mounting channel of the upper guide rail 15 and locked by locking screws 712. The upper guide rail 15 is symbolically shown with dashed lines.

If the upper and lower guide rails 15, 16 comprise an identical or at least functionally identical holding channel, the upper spacer device 7 can be turned by 180° and used as a lower spacer device 8, for example when using a scissor cross as holding device 4. The spacer device 7 can also be connected to a device magnet member 771 on one side only, if only one door element 111 is to be moved into the door compartment 118.

On both sides, the device body 71 comprises in this preferred embodiment threaded holes into which connection screws 78 can be screwed to mount the first device magnet member 771 on one side and the second device magnet member 772 on the other side of the device body 71. Preferably, an elastic element 781 is provided between the connection screws 78 and the device magnet members 771, 772, which transmits the compressive force of the connection screws 78 elastically to the device magnet members 771, 772. However, the device magnet members 771, 772 can also be connected to the device body 71 in a force-fitting or form-fitting manner in other ways. For example, the device magnet members 771, 772 can be inserted into recesses in the device body 71, for example glued and/or encapsulated or only held magnetically. If the device body 71 is made of a ferromagnetic material, the device magnet members 771, 772 are automatically held in the recesses of the device body 71.

The first plate-shaped door magnet member 751 is arranged inside a door recess 1110 on the inner side 1111 of the first door element 111 and fastened by means of a mounting screw 7511. A cover or cap 76 is inserted into the door recess 1110, the outer side of which lies in a plane with the inner side 1111 of the first door element 111. The second plate-shaped door magnet member 752 is located inside a door recess 1120 on the inner side 1121 of the second door element 112 and fastened by means of a mounting screw 7521. A cover or cap 76 is inserted into the door recess 1120, the outer side of which lies in a plane with the inner side 1121 of the second door element 112.

The cover 76 can for example be made of metal, plastic or wood. Alternatively, the cover 76, for example a foil or a plate, can cover the entire inner side 1111, 1121 of the door elements 111, 112. In preferred embodiments, the cover 76 therefore forms a coating on the door elements 111, 112.

FIG. 4*b* shows the upper spacer device 7 of FIG. 4*a* after mounting the device magnet members 771, 772. Instead of the upper guide rail 15, the upper guide carriage 5 with the support rollers 591 and the guide rollers 592 is shown in this illustration. It can be seen that the door elements 111, 112 shown in sectional view are held at a distance from the device body 71 by the spacer rollers 791, 792 and are simultaneously pulled against the spacer rollers 791, 792 by the device magnet members 771, 772. The door 11 is thus held precisely both when it is moved and when it is stationary.

FIG. 5 shows the upper and lower spacer devices 7, 8 of FIG. 2 in a preferred embodiment for guiding a door 11 with only one door element 111, from which a centre piece has been cut out. The spacer devices 7, 8 are consequently only provided on one side with a spacer roller 791, 891 and a device magnet member 771, 871. The upper guide rail 15 and the lower guide rail 16, which hold the upper and lower spacer devices 7, 8 front-sided, are shown shortened. Door recesses 1110 are provided on the inner side 1111 of the door element 111, which extend over almost the entire width of the door element 111. A portion of the plate-shaped upper door magnet members 751 has been cut away to show the door recess 1110. The plate-shaped door magnet members 751, 752 comprise holes 7510, 8510 into which mounting screws 7511 are inserted. The covers 76, 86 extend across the entire length of the door recesses 1110.

FIG. 6*a* shows the upper spacer device 7 of FIG. 5, which is held by the upper guide rail 15. The upper guide rail 15 comprises a mounting channel 150 on the lower side, into which a mounting beam 711 connected to the device body 71 of the upper spacer device 7 is inserted. The inserted mounting beam 711 is locked or tensioned by means of locking screws 712. Above the mounting channel 150, the upper guide rail 15 comprises a cross-section within which the upper guide carriage 5 can be moved up to a buffer device or damper device 3.

In this embodiment, the device magnet member 771, which is offset from the spacer roller 791, is plate-shaped and preferably held in a recess 710 of the device body 71 and fixed with a connection screw 78. The device magnet members 771, 772; 871, 872, on the other hand, can comprise any shape and, for example, be cylindrical, pill-shaped, tablet-shaped, plate-shaped and have a round, rectangular, square or polygonal cross-section. The contactless cooperation of the door magnet members 751, 752; 851, 852 and the device magnet members 771, 772; 871, 872 allows the latter to be connected to the device body 71, 81 at a location where no further function of the spacer device 7, 8 is impaired.

The spacer roller 791 is rotatably mounted in a roller holder 715 by means of a bearing shaft 790. The roller holder 715 is preferably held form-fittingly in a bearing chamber 716 of the device body 71 and is fixed by means of a mounting screw or adjustment screw 713. Preferably, the roller holder 715 is slidably mounted and can be positioned as desired by means of the adjustment screw 713.

It should be noted that in this preferred embodiment the spacer roller 791 projects beyond the device body 71 not only on the side of the associated device magnet members 78 but also front-sided. The door element 111 is therefore not only guided during the axial displacement within the door compartment 18 but also during the pivoting movement at the exit of the door compartment 18 and kept at a distance from the device body 71.

FIG. 6*b* shows the lower spacer device 8 of FIG. 5, which is held by the lower guide rail 16. The lower guide rail 16 also comprises a mounting channel 160 in which a mounting beam 811 connected to the device body 81 of the lower spacer device 8 is held. The lower roller holder 815 is also slidably mounted and comprises a buffer body 8153 which holds a buffer element 8154 and which is guided through an opening in the device body 81.

The lower and upper spacer devices 7, 8 are therefore basically interchangeable. Furthermore, the spacer devices 7, 8 can advantageously comprise further functional elements, such as preferably adjustable buffer devices, damping devices, stop device, locking lever 83, rope connection devices 84.

FIG. 7 shows a part of the displacement device 10 of FIG. 2 with the upper spacer device 7, which in this preferred embodiment comprises two spacer rollers 791, 792. The first spacer roller 791 is held by a roller holder 715 which is slidably mounted within a bearing chamber 716 of the device body 71 and is selectively slidable by means of an adjustment screw 713. The guide carriage 5 guided within the upper guide rail 15 is advanced with the carriage body 51 to the damping device 3.

FIG. 8 shows an exploded view of the upper spacer device 7 of FIG. 7. The roller holder 715 comprises guide ribs 7151 on the lower side and the upper side, which are guided in corresponding guide tracks 718 of the bearing chamber 716. The roller holder 715 is also preferably integrally connected to a buffer piston 7153, on the front side of which a buffer element 7154 is held. The spacer roller 791 and the buffer element 7154 are therefore preferably firmly coupled to each other, so that when adjusting the end stop of the upper guide carriage 5, the first spacer roller 791 is simultaneously optimally positioned and does not have to be positioned separately. In addition, the roller holder 715 comprises a holding flange 7152, by means of which the head of the adjustment screw 713 is held rotatably but not axially displaceably within a screw chamber. Furthermore, the roller holder 715 comprises a tool opening 7150 through which a screwdriver can be inserted into the screw chamber to turn the adjustment screw 713.

The device body 71 comprises a bearing chamber 716 into which the roller holder 715 can be inserted. A transfer opening 717 is provided on the rear wall of the bearing chamber 716, through which the buffer piston 7153 with the buffer element 7154 is guided. A threaded bore 719 is also provided on the rear wall of the bearing chamber 716, into which the adjustment screw 713 is screwed. By turning the adjustment screw 713, the roller holder 715 with the first spacer roller 791 and the buffer element 7154 can therefore be moved relative to the device body 71.

LIST OF REFERENCES

1 functional entity, piece of furniture or room unit
1A side walls
1B upper board
1C lower board
1D separation wall
10 displacement device
100 furniture opening
11 door with one or two door elements
111 first door element
1110 door recess
1111 inner side of the first door element 111
1112 outer side of the first door element 111
1115 rear-sided edge of the first door element 111
1116 front-sided edge of the first door element 111
112 second door element
1120 door recess
1121 inner side of the second door element 112
1122 outer side of the second door element 112
1125 rear-sided edge of the second door element 112
1126 front-sided edge of the second door element 112
131 mounting hinges
132 door hinges
14 mount profile
141 guide channel
15 upper guide rail
150 mounting channel
16 lower guide rail
160 mounting channel
17 support rail
171 suppor rail members
18 door compartment
180 entrance opening of the door compartment 18
181 rear side of the door compartment 18
2 drive device
21 drive unit
22 pull cord
23 first deflection roller
230 deflection unit
24 second deflection roller
3 buffer device or damper device
4 holding device
41 upper roller pair
421 first holding cable
422 second holding cable
43 lower roller pair
44 first rear-sided cable connection device
45 second rear-sided cable connection device
5 upper guide carriage
5F front carriage
51 upper carriage body
591 support rollers
592 guide rollers
6 lower guide carriage
61 lower carriage body
692 guide rollers
7 upper space device
71 device body
710 recess in the device body 71
711 mounting beam
712 locking screw
713 adjustment screw
715 roller holder
716 bearing chamber
7150 tool opening
7151 guide elements, guide ribs
7152 holding element, holding flange
7153 buffer piston
7154 buffer element
716 bearing chamber
7171 transfer opening
718 guide tracks
719 threaded bore
72 pull cord connection
73 upper locking lever
74 front-sided second cable connection device
751 upper first door magnet member
7510 bore

7511 mounting screw
752 upper second door magnet member
7521 mounting screw
76 cover
771 first upper device magnet member
772 second upper device magnet member
78 connection screw
781 elastic element
790 bearing shafts
791 first upper spacer roller
792 second upper spacer roller
8 lower spacer device
81 device body
810 receptacle
811 mounting beam
815 roller holder
8153 buffer piston
8154 buffer element
83 lower locking lever
84 front-sided first cable connection device (adjustable)
851 lower first door magnet member
8510 bore
852 lower second door magnet member
86 cover
871 first lower device magnet member
872 second lower device magnet member
88 connection screw
890 bearing shafts
891 first lower spacer roller
892 second lower spacer roller
x running axis of the mounting profile 14

The invention claimed is:

1. A functional entity comprising a door compartment and a door, wherein the door comprises at least a first door element, the first door element comprises a rear-sided edge and a front-sided edge, the first door element is connected to a displacement device arranged inside the door compartment, the displacement device is displaceable into the door compartment and is pivotable outside the door compartment in order to cover an opening of the functional entity, the displacement device comprises a mounting profile, the mounting profile is connected by mounting hinges to the rear-sided edge of the first door element and is held by a holding device vertically aligned and displaceable along a running axis between an entrance opening and a rear side of the door compartment, a spacer device with a device body is provided, the spacer device is arranged at the entrance opening of the door compartment and the spacer device comprises a first spacer roller on which the first door element can roll during displacement without contacting the device body of the spacer device, the first door element is connected to a first door magnet member on a side of the first door element facing the spacer device, the spacer device on a side of the spacer device facing the first door magnet member is connected to a first device magnet member, the first device magnet member is configured to magnetically interact with the first door magnet member in such a way that the first door element is pulled against the spacer device as soon as the first door magnet member and the first device magnet member lie opposite to one another, and at least one of the first door magnet member and the first device magnet member is a permanent magnet.

2. The functional entity according to claim 1, further comprising a second door element, a second door magnet member, and a second device magnet member wherein the spacer device comprises a second spacer roller facing the second door element, the first door element is connected at the front-sided edge by door hinges to a corresponding rear-sided edge of the second door element, the second door element is insertable in parallel alignment with the first door element into the door compartment in such a way that the spacer device is enclosed between the first door element and second door element, the second door element is connected to the second door magnet member on a side of the second door element facing the spacer device, and the spacer device on a side of the spacer device facing the second door magnet member is connected to the second device magnet member, the second device magnet member magnetically interacts with the second door magnet member in such a way that the second door element is pulled against the spacer device as soon as the second door magnet member and the second device magnet member lie opposite to one another, and at least one of the second door magnet member and the second device magnet member is a permanent magnet.

3. The functional entity according to claim 2, wherein, the spacer device comprises a first spacer device and a second spacer device;

the second door magnet member comprises an upper second door magnet member and a lower second door magnet member;

the second door element is connected to the upper second door magnet member on the side of the second door element facing the first spacer device; and the first spacer device is disposed on a side facing the upper second door magnet member and is connected to an upper second device magnet member, the upper second device magnet member magnetically interacts with the upper second door magnet member;

the second door element is connected to the lower second door magnet member on the side of the second door element facing the second spacer device;

the second spacer device on a side facing the lower first door magnet member is connected to a lower second device magnet member; and the lower second device magnet member magnetically interacts with the lower second door magnet member.

4. The functional entity according to claim 1, wherein, the spacer device comprises a first spacer device and a second spacer device, the first door magnet member comprises an upper first door magnet member and a lower first door magnet member, at an upper side of the door compartment the first spacer device is arranged, the first door element is connected to the upper first door magnet member on the side of the first door element facing the first spacer device, the first spacer device on a side of the first door element facing the upper first door magnet member is connected to an upper first device magnet member, the upper first device magnet member magnetically interacts with the upper first door magnet member, at a lower side of the door compartment the second spacer device is arranged, the first door element is connected to the lower first door magnet member on the side of the first door element facing the second spacer device, the second spacer device on a side of the first door element facing the lower first door magnet member is connected to a lower first device magnet member, and the lower first device magnet member cooperates with the lower first door magnet member.

5. The functional entity according to claim 1, wherein, the spacer device comprises a first spacer device, the mounting profile is connected at an upper end piece to an upper guide carriage, and the upper guide carriage is slidably supported on an upper guide rail by which the first spacer device is held.

6. The functional entity according to claim 1, wherein the spacer device comprises a first spacer device and a second spacer device, the mounting profile is connected at a lower end piece to a lower guide carriage, the lower guide carriage is slidably supported on a lower guide rail by which the second spacer device is held.

7. The functional entity according to claim 1, further comprising a second door magnet member and a second door element wherein, the first door magnet member is arranged and fixed in a door recess of the first door element, or the first door magnet member and the second door magnet member are arranged and fixed in the door recess of the first door element and a second door recess of the second door element.

8. The functional entity according to claim 1, further comprising a second door magnet member wherein, the first door magnet member is plate-shaped and extends parallel to the running axis of the mounting profile, or the first door magnet member and the second door magnet member are plate-shaped and extend parallel to the running axis of the mounting profile.

9. The functional entity according to claim 1, further comprising a second door magnet member wherein, at least one of the first door magnet member and the second door magnet member is covered by a cover or a coating;

the covers or coatings cover the first door magnet member and the second door magnet member or an entirety of an inner side of the door element.

10. The functional entity according to claim 1, further comprising a second spacer roller, a second door magnet member, and a second door element, wherein, the first spacer roller is arranged to confront the first door magnet member or the second door magnet member or the cover or coating lying thereon, and the first spacer roller can roll thereon during a displacement of the first door element or the second door element; or the first spacer roller and the second spacer roller are arranged to confront the first door magnet member or the second door magnet member or the cover or coating lying thereon, and the first spacer roller and the second spacer roller can roll thereon during the displacement of the first door element or the second door element.

11. The functional entity according to claim 1, further comprising a second door magnet member and a second door element, wherein, the first door magnet member is plate-shaped and extends from the front-sided edge of the first door element wholly or partially across a width of the first door element, and/or the second door magnet member is plate-shaped and extends from a rear-sided edge of the second door element wholly or partially across the width of the second door element.

12. The functional entity according to claim 1, further comprising a second device magnet member wherein, the first device magnet member is plate-shaped, pill-shaped, tablet-shaped or cylindrical, and the first device magnet member is aligned parallel to the first door magnet member, or the first device magnet member and the second device magnet member are plate-shaped, pill-shaped, tablet-shaped or cylindrical, and the first device magnet member and the second device magnet member are aligned parallel to an associated first door magnet member and second door magnet member; or the first device magnet member comprises a plurality of magnetic elements that are plate-shaped, pill-shaped, tablet-shaped or cylindrical, or the first device magnet member and the second device magnet member comprise a plurality of magnetic elements that are plate-shaped, pill-shaped, tablet-shaped or cylindrical.

13. The functional entity according to claim 1, further comprising a second spacer roller wherein, the first spacer roller is held by a roller holder which is displaceable in a bearing chamber and the first spacer roller is held and is adjustable by an adjustment screw, or the first spacer roller and the second spacer roller are held by the roller holder which is displaceable in the bearing chamber and the first spacer roller and the second spacer roller are held and are adjustable by means of the adjustment screw; or the first spacer roller is held by the roller holder, the roller holder is slidable in the bearing chamber, and the first spacer roller is held and is adjustable by the adjustment screw and the first spacer roller is connected to a buffer piston holding a buffer element forming a stop for the mounting profile or for a guide carriage, or the first spacer roller and the second spacer roller are held by the roller holder, the roller holder is slidable in the bearing chamber, and the first spacer roller and the second spacer roller are held and are adjustable by the adjustment screw and the first spacer roller and the second spacer roller are connected to the buffer piston holding the buffer element forming the stop for the mounting profile or for the guide carriage.

14. The functional entity according to claim 1, wherein, the spacer device comprises adjustable or non-adjustable coupling elements for coupling the holding device, and/or the spacer device comprises at least one stop element or damper element, the at least one stop element or damper element can cooperate with a guide carriage, and/or the spacer device comprises at least one stop element or damper element, the at least one stop element or damper element can cooperate with the guide carriage.

15. The functional entity according to claim 1, in an embodiment of a piece of furniture or a room unit of a building.

* * * * *